United States Patent [19]

Morris

[11] 4,264,166
[45] Apr. 28, 1981

[54] PHOTOGRAPHIC FILM CASSETTE, CASSETTE HOLDER AND SYSTEM

[75] Inventor: Robert E. Morris, Plantation, Fla.

[73] Assignee: Robert C. Schwebke, Miami, Fla.

[21] Appl. No.: 17,481

[22] Filed: Mar. 5, 1979

[51] Int. Cl.³ .................... G03B 9/40; G03B 17/02; G03B 17/24; G03B 17/26

[52] U.S. Cl. .................... 354/62; 352/78 R; 354/109; 354/246; 354/275; 354/288

[58] Field of Search ............... 354/275, 288, 62, 109, 354/245, 246, 283, 241, 242, 261, 240, 253, 236; 242/71, 71.3, 71.7; 352/78 R

[56] References Cited

U.S. PATENT DOCUMENTS

| | | | |
|---|---|---|---|
| 533,618 | 2/1895 | Stoelting | 354/253 X |
| 583,700 | 6/1897 | Esmond | 354/253 |
| 1,948,141 | 2/1934 | Stokes | 354/283 X |
| 2,017,979 | 10/1935 | Mayo | 354/253 X |
| 2,257,424 | 9/1941 | Meyer | 354/275 |
| 2,427,585 | 9/1947 | Williams | 352/78 R |
| 2,741,168 | 4/1956 | Schreiber | 354/275 |
| 2,817,996 | 12/1957 | Meyst | 354/62 |
| 2,868,069 | 1/1959 | Elmore | 354/62 |
| 2,987,976 | 6/1961 | Martin | 354/253 X |
| 3,158,523 | 11/1964 | Morrow | 354/109 |
| 3,247,773 | 4/1966 | Doblin et al. | 242/71.3 |
| 3,422,446 | 1/1969 | Riggles | 354/109 X |
| 3,478,658 | 11/1969 | Hu et al. | 242/62 |
| 3,648,582 | 3/1972 | Nerwin | 242/275 |
| 3,650,194 | 3/1972 | Ib | 242/254 |
| 3,678,839 | 7/1972 | Michaelis | 354/253 |
| 3,685,414 | 8/1972 | Good | 242/204 |
| 3,780,635 | 12/1973 | Prochnow | 354/275 |
| 3,782,259 | 1/1974 | Noble | 242/190 |
| 3,821,771 | 6/1974 | Johnson | 354/293 |
| 3,910,692 | 10/1975 | Scibilia | 354/275 X |
| 3,961,349 | 1/1976 | Forsyth et al. | 354/295 |
| 4,016,584 | 4/1977 | Sato et al. | 354/236 X |
| 4,175,719 | 11/1979 | Speckman et al. | 352/78 R |

FOREIGN PATENT DOCUMENTS

| | | | |
|---|---|---|---|
| 580340 | 7/1959 | Canada | 354/275 |
| 527285 | 10/1940 | United Kingdom | 354/275 |

*Primary Examiner*—J. V. Truhe
*Assistant Examiner*—Shelley Wade
*Attorney, Agent, or Firm*—Jenkins, Coffey, Hyland, Badger & Conard

[57] ABSTRACT

A photographic system is particularly adapted for use in a check security system and offers novel features and advantages for such systems.

Such system includes a film cassette and film cassette holder. The film cassette may be molded from plastic parts and can be adapted for assembly and operation without fasteners. The film cassette forms a light tight enclosure with a first opening to admit an image and expose the film within the enclosure and a second opening to permit operation of a film take-up within the cassette. The system includes shutter means adjacent the image-admitting opening of the cassette that can be operated by an actuator carried by the cassette holder. A second actuator carried by the cassette holder can engage and operate the film take-up of the cassette. The cassette can movably carry elements of the system shutter means and provide reliable film take-up and film guidance within the cassette enclosure. The system is capable of being operated in a lighted environment and permits the controlled exposure of film carried within the cassette to a plurality of sequential and separate images focused at the image-admitting opening of the cassette.

24 Claims, 9 Drawing Figures

PHOTOGRAPHIC FILM CASSETTE, CASSETTE HOLDER AND SYSTEM

This invention relates to a new photographic film cassette, cassette holder and system, and particularly a cassette and cassette holder and system for a check security system.

Known photographic systems include complete cameras including lens systems, shutter mechanisms and film advancement mechanisms adapted to accept the insertion of film cassettes carrying unexposed film. Film cassettes for such cameras provide the user with convenience in handling and loading his camera. With the availability of such film cassettes, there have been suggestions of camera portions carrying an optical system and a shutter, and providing, when attached to a film cassette, a light tight enclosure in an effort to thus provide a compact and inexpensive camera. Examples of such systems are contained in U.S. Pat. Nos. 2,257,424; 2,741,168; 3,247,773; 3,648,582; and 3,782,259. There have also been suggestions of inexpensive, disposable cameras, as for example in U.S. Pat. Nos. 3,650,194 and 3,685,414. The disclosures of such patents are directed to the provision of simple inexpensive cameras for every day use.

Contrary to these disclosures, this invention is particularly adapted for use in a check security system and offers novel features and advantages for such systems.

A photographic system of this invention includes, for example, a film cassette and film cassette holder. The film cassette forms a light tight enclosure with a first opening to admit an image and expose the film within the enclosure and a second opening to permit operation of a film take-up within the cassette. The film cassette holder includes a bracket having portions to support and engage the film cassette without obstructing the image-admitting opening of the cassette. The system includes shutter means adjacent the image-admitting opening of the cassette that is operated by an actuator carried by the cassette holder. A second actuator carried by the cassette holder engages and operates the film take-up of the cassette. The system is thus capable of being operated in a lighted environment and permits the controlled exposure of film carried within the cassette to a plurality of sequential and separate images focused at the image-admitting opening of the cassette.

The film cassette may be molded from plastic parts and can be adapted for assembly and operation without fasteners. The enclosure of the cassette can be formed in two parts, with the enclosure having, as its first opening, a window for an image, and as its second opening, a bearing to provide for operation of a film take-up within the enclosure. A shutter mechanism can be movably carried by the two parts making up the enclosure after their assembly. The shutter mechanism in its normal position will close the cassette window and will be operable to controllably expose film within the cassette to an image focused at the cassette window. The film take-up of this cassette can include an internal spool and a driving spindle. The driving spindle extends into the cassette through the bearing opening and into the internal spool. The driving spindle can thus be operated from outside the cassette and, through its frictional engagement with the internal spool, can drive the film take-up. The driving spindle and spool form a light barrier for the bearing opening of the enclosure. Upon insertion of the driving spindle into the spool, assembly of the shutter means to the enclosure parts, and assembly of the two parts making up the enclosure, the cassette is formed with light barriers at its interfitting periphery, image-admitting window and the opening for operation of the film take-up. No fasteners are necessary for assembly of the film cassette, and it may be sealed as an integral operable unit by deformation or melting of the interfitting portions of the two parts making up the cassette enclosure.

The shutter means of such a cassette can be provided by a pair of molded plastic elements that are slidably carried by the cassette at its front adjacent its image-admitting window. Such a pair of elements can be slidably carried on the outside surface of the cassette in front of the image-admitting window. One of said elements can include a film-exposing aperture and can engage and operate the other of the elements to move it into a position barring light through the cassette window after the film-exposing aperture of the first element has moved past the window.

In a reciprocating shutter means, such a pair of elements can comprise small plates, and each of the plates can slide in one of the pair of parallel and adjacent grooves molded on the outside surface of the cassette and along the front surface of the cassette transversing the cassette window. One of the elements can include two surfaces projecting in the direction of the other of the elements, the first of said surfaces being located adjacent the edge of the first element and engaging the second element at its one end. The second of the two surfaces can be located on the first element with the film-exposing aperture of a first element between the two projecting surfaces. Thus, after the film-exposing aperture of the first element has moved past the cassette window in one direction, the first surface of the first element will engage and move the second element into a light barrier position where it will remain until the film-exposing aperture has travelled past the cassette window in the other direction. Once the film-exposing aperture of the first element has moved past the cassette window, its second projecting surface will engage the second element and return it to its original position.

The film take-up of such a cassette can include an inner spool having an open cylindrical center portion with a disk at one end. The driving spindle can extend through a second opening in the cassette that provides a bearing for the film take-up and permits its operation from outside the cassette. The end of the driving spindle outside of the cassette includes a hub that forms a sprocket to drive the film take-up. Upon assembly of the driving spindle through the bearing opening and into the spool within the cassette, a barrier is formed by the disk and the hub to prevent light from entering the cassette through the bearing. The outer periphery of the disk of such a spool can include a plurality of projecting teeth, and the interior of the cassette can include an axle-like projection adjacent to the periphery of the spool and parallel to its open cylindrical center section. An interlocking sprocket can be rotatably carried on the axle-like projection with a plurality of projecting teeth spaced about its periphery. The teeth of the interlocking sprocket and the teeth of the spool can be designed to engage so that the interlocking sprocket is driven by the spool through a defined increment of movement. The teeth of the interlocking sprocket can be provided with projections to engage holes at the edge of the film and advance the film in defined increments one frame at a time. Such engagement can also prevent rotation of the spool in a direction counter to the direction of its operation by the driving spindle.

Within the film cassette, at one end an unexposed roll of film can be supported within a plurality of surfaces projecting from the inner surfaces of the cassette. Such projecting surfaces can position the roll of film, prevent its unwinding, and reduce the frictional engagement between the film and the cassette. A film guide can be provided within the cassette immediately adjacent the image-admitting opening. Such a film guide can form an arcuate guide wall leading from the unexposed roll of film to a chamber formed by walls within the cassette immediately behind the cassette window. Resilient backing material can be located within the chamber to urge the film into cooperation with the film cassette walls, thus positioning the film in the cassette window. Location of the axle-like projection and interlocking sprocket between the chamber and the film take-up can permit the projecting teeth of the interlocking sprocket to guide, as well as advance, the film from the cassette window onto the film take-up.

In a photographic system, the film cassette can be held in a holder having a first portion to support the film cassette and a second portion engaging and positioning the cassette for operation. The cassette holder can provide actuation of both shutter means and film take-up. The film cassette holder can also position and hold the film cassette with respect to an image-focusing optical system and can thus operate a shutter on the cassette and advance a film strip within the cassette for the sequential exposure of a plurality of frames on the film. Where shutter means is carried at the forward portion of the film cassette, the elements of the shutter means can be provided with an extension projecting forwardly through an opening at the front of the film cassette holder to be engaged by the actuator carried by the film cassette holder.

The system of this invention can be operated in the presence of light. The system provides security against the inadvertent exposure of an image already formed on the film in the event of removal of the cassette from the system. The cassette can be protected against accidental exposure of and loss of an exposed image on the film by the shutter means incorporated into the cassette. Moving parts of the system are periodically replaced as the film cassettes are replaced. The system can be inexpensively manufactured and molded from thermoplastic materials and can be assembled without the need for fasteners. Furthermore, the system can be sealed so that access to the exposed film can only be obtained by breaking the cassette.

Further features and advantages will be apparent from the drawings and the following description in which:

FIG. 7 is a drawing showing a photographic system of this invention, including the cassette of FIG. 1 and FIG. 2 and a cassette holder;

Figure 1:
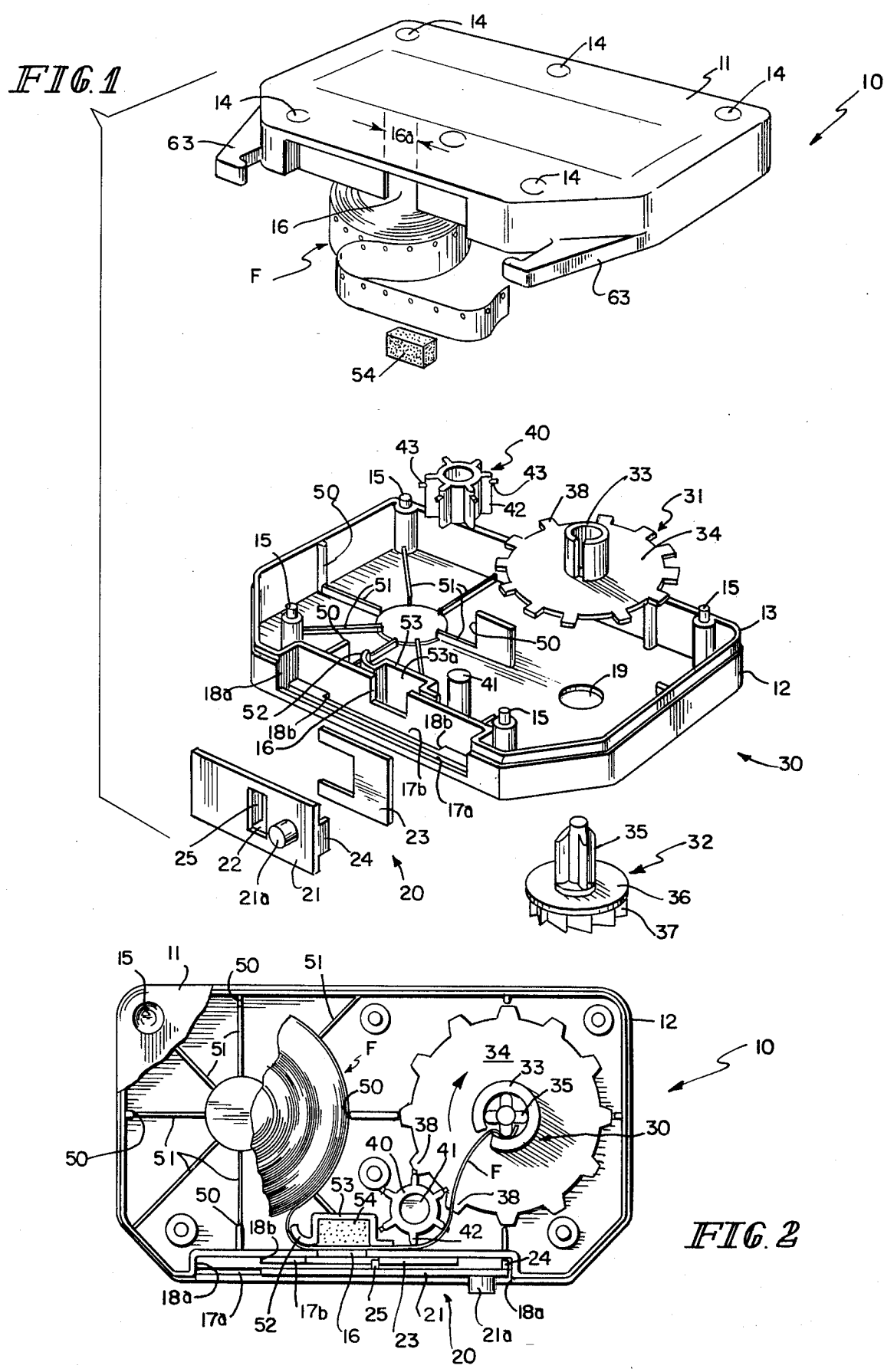
FIG. 1 is an exploded view of a film cassette of this invention.

A film cassette 10 of this invention is illustrated in the exploded view of FIG. 1. The cassette enclosure may be molded in two interfitting parts from a thermoplastic material. The first cassette enclosure part 11, as shown in FIG. 1, can form the upper half of the cassette enclosure, and the second cassette enclosure part 12 can form the lower half of the cassette enclosure. The first and second cassette enclosure parts interfit at their periphery to provide a barrier to light when assembled. Such an interfitting light barrier can be the rabbeted portion 13 of the peripheral walls of the cassette enclosure parts. A plurality of openings 14 may be formed in one of the cassette enclosure parts and a plurality of interfitting projections 15 may be formed on the other enclosure part to mate with the holes 14. Upon assembly, the interfitting parts 11 and 12 may be sealed together by thermoplastic welding of the interfitting portions, as for example by thermoplastically welding the openings 14 of the first enclosure part to the interfitting projections 15 of the second enclosure part of the cassette.

Figure 2:
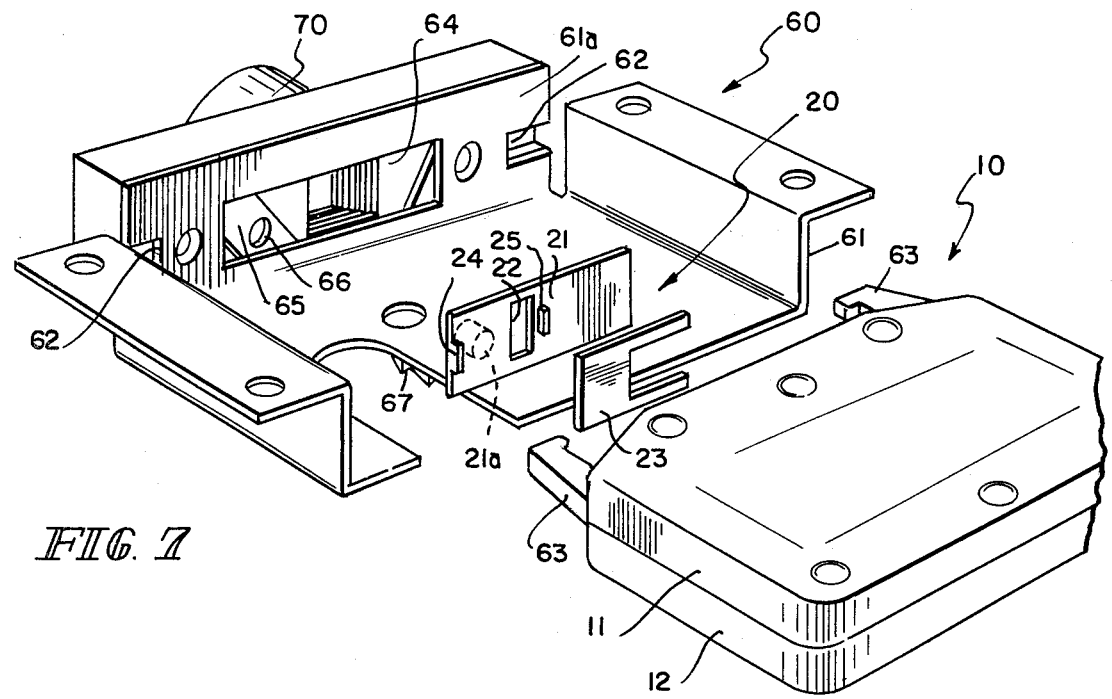
FIG. 2 is a plan view of the cassette of FIG. 1 with portions broken away, including an unexposed roll of film which is partially broken away.

As shown in FIG. 1 and FIG. 2, the cassette 10 incorporates a shutter means 20 and a film take-up 30 which are made up of parts fitted to the cassette enclosure parts in such a manner that they are retained and operable to expose a roll of film "F" controllably in a series of separate and sequential frames. The cassette of this invention may be assembled from parts that have been molded from thermoplastic material without fasteners.

As shown in FIGS. 1 and 2, the cassette enclosure parts form a first image-admitting opening or window 16 in their forward wall. The shutter means 20 is movably carried by the cassette enclosure parts 11 and 12 forwardly of the image-admitting opening 16. The shutter means includes a first element 21 having a film-exposing aperture 22 formed in its central portion. The shutter means also includes a second shutter element 23 to act as a gate and a barrier to light during a portion of the cycle of operation of the shutter means. The first and second shutter elements 21 and 23 are placed in a pair of parallel grooves 17a and 17b, respectively, formed in the first and second cassette enclosure parts 11 and 12. The grooves 17a and 17b (shown only in the lower second enclosure part 12 of FIG. 1) form two parallel tracks in the forward surface of the cassette transverse to the image-admitting opening 16. The first shutter element 21 is slidably carried by the cassette 10 in the first track formed by groove 17a. The second shutter gate element 23 is slidably carried by the cassette in the second track formed by groove 17b. The shutter means 20 can be reciprocated to controllably expose the film F through the image-admitting opening 16 in the following manner.

Figure 3:
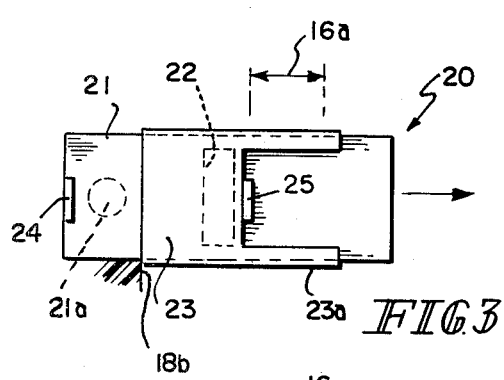
FIGS. 3-6 are drawings showing the operation of the shutter means of the cassette of FIG. 1 and FIG. 2.

FIG. 3-FIG. 6 illustrate the shutter means 20 viewed from the rear (as if the viewer is within the cassette) and the manner of its operation to controllably expose film F through the image-admitting opening 16. FIG. 3 shows the shutter means 20 in its normal or unactuated position, which as shown in FIG. 2 is at the right of the cassette when viewed from the front, although the normal position of the shutter means 20 may be on the other side of the cassette if that is more convenient.

In its normal or unactuated position, a central portion of the first element 21 covers the image-admitting opening 16 of the cassette, whose position is indicated in FIG. 1 and FIGS. 3-6 by the numbered arrow 16a, and the film-exposing aperture 22 of the first element 21 is covered by the second element 23. The second gate element 23 of the shutter means may be, as illustrated, provided with extended edge portions 23a for sliding in the groove 17b.

The first element 21 of the shutter means 20 may be provided with means to operate the second element 23 within groove 17b as the first element slides in groove 17a. Such means can include a pair of projecting surfaces 24 and 25. The first projecting surface 24 as shown in FIG. 3 is located at the edge of the first element 21, and the second projecting surface 25 is located in the central portion of the first element 21. The film-exposing aperture 22 of the first element is located between the means 24 and 25 to operate the second element 23.

Figure 5:
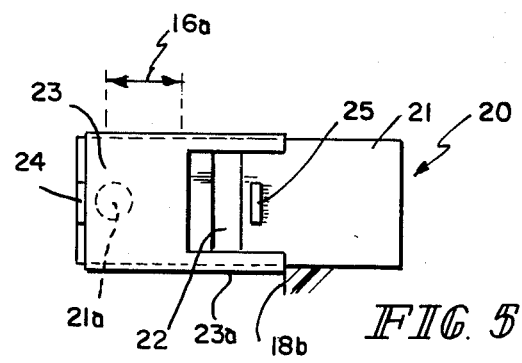
Figure 4:
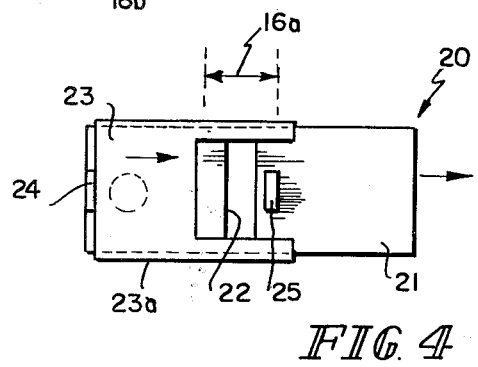
Figure 6:
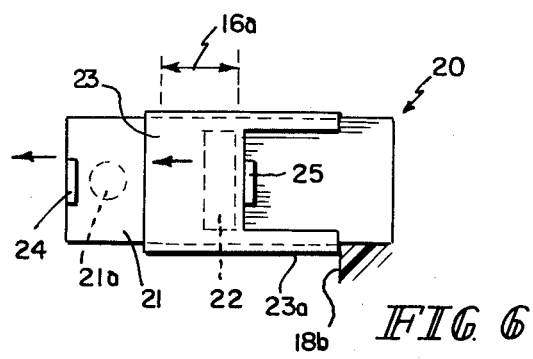

In operation of the shutter means 20 as the first element 21 slides, for example, to the right as shown in FIG. 3, the film-exposing aperture 22 is passed across the image-admitting opening (whose position is shown by the numbered arrow 16a) as shown in FIG. 4. As further shown in FIG. 4, the first projecting surface 24 engages the edge of the second shutter element 23 and moves it to the right with the first shutter element 21. At the end of the travel of the shutter means 20 to the right, as shown in FIG. 5, the second gate element 23 covers the light-admitting opening 16 (whose position is shown by the numbered arrow 16a). As the first shutter element 21 travels to the left as shown in FIG. 6, the second shutter gate element 23 remains in a position covering the image-admitting opening (whose position is shown by the numbered arrow 16a), thereby blocking the entry of light to the image-admitting opening 16 as the film-exposing aperture 22 travels to the left past the image-admitting opening. As the film-exposing aperture 22 is in a position where the second shutter element 23 is a barrier to light reaching the image-admitting opening as shown in FIG. 6, the second projecting surface 25 engages the edge of the second gate element 23 and moves it to the left with the first shutter element 21 and back to the unactuated position shown in FIG. 3. As illustrated in FIGS. 1 and 2, the travel of the first and second shutter elements may be limited by the length of tracks 17a and 17b and, for example, wall portions 18a and 18b of the cassette enclosure.

Referring now to FIGS. 1 and 2, the film take-up of the cassette 10 comprises a spool 31 and a driving spindle 32 and may be provided with an interlocking sprocket 40. The spool 31 is carried within the cassette and is operated by the driving spindle 32. The driving spindle 32 extends through a second opening 19 in the second cassette enclosure part 12 to engage the inner spool 31. The inner spool 31 includes an open cylindrical inner spool section 33 having a disk 34 at one end. The driving spindle 32 has a first spindle portion 35 having sufficient length to extend through the cassette opening 19 and into the central portion 33 of the inner spool 31 to frictionally engage and drive the film take-up as shown in FIGS. 1 and 2. As illustrated in FIG. 2, the central portion 33 of the inner spool 31 may be split to permit the film F to be inserted within the central portion 33 of the spool and engaged between the spool portion 33 and the spindle portion 35 to provide a more positive film take-up.

The driving spindle has at the end outside of the cassette, a hub 36 forming a sprocket 37 to permit the driving spindle and thus the film take-up to be operated from outside the cassette. The walls of the opening 19 of the second cassette portion 12 act as a bearing for the rotation of the driving spindle 32. If necessary, the lower surface of disk 34 and the upper surface of hub 36 may be provided with surfaces to reduce the frictional engagement between the film take-up and the inner and outer surfaces of the second cassette enclosure means 12. The extended surfaces of the disk 34 of spool 31 and of the hub 36 of driving spindle 32 cover the second opening 19 of the cassette enclosure and act as a barrier to light entering the enclosure at the film take-up bearing.

The film take-up may also be provided with means to provide for positive incremental advance of the film and to prevent rotation of the film take-up in a direction counter to the direction in which it is driven. Such means as shown in FIG. 1 and FIG. 2 can include an interlocking sprocket 40 which is rotatably carried on an axle-like projection 41 from one of the cassette enclosure parts. As shown in FIGS. 1 and 2, the interlocking sprocket 40 is provided with a plurality of teeth 42 and the periphery of the disk 34 of the inner spool 31 is also provided with a plurality of projecting teeth 38. The pitch and contour of the projecting teeth 38 of the inner spool and of the projecting teeth 41 of the interlocking sprocket are so designed so that, as shown in FIG. 2, the projecting teeth 42 of the intelocking sprocket 40 bear against the trailing edge of the teeth 38 of the inner spool 31 and prevent its rotation counter to the direction of rotation of the inner spool in taking up the film. In addition, the leading edge of the teeth 38 of the inner spool 31 may engage the projecting teeth 42 of interlocking sprocket 40 and drive it rotationally on the axle-like projection 41. The projecting teeth 42 maybe provided with a plurality of film-engaging projections 43 to engage openings at the edge of the film F and to provide a positive increment of film advancement in pulling and guiding the film as it is taken up within the cassette. As the film take-up of the cassette is operated from outside, it is thus capable of providing in sequence a series of separate and uniform frames, each of which can be exposed with an independent image.

The film F is placed within the cassette in a roll supported only by a plurality of surfaces projecting from the inner walls of the cassette parts. As shown in FIG. 1 and FIG. 2, these projecting and film-supporting surfaces can include a plurality of surfaces 50 located about the periphery of the film to maintain its position and location at one end within the cassette as it is unwound. The roll is also supported by surfaces 51 projecting from the inner planar faces of the cassette parts as shown in FIG. 1 and FIG. 2. Such projecting surfaces reduce the frictional engagement of the film and the cassette. The film is guided within the cassette to the film take-up by an arcuate wall 52, as shown in FIG. 2, leading from the film roll to wall means 53 forming a chamber 53a immediately adjacent the image-admitting opening 16 within the cassette. A resilient material 54 is placed within and encompassed by the chamber 53a and presses against the film F at the image-admitting opening 16. The inner walls of the cassette enclosure parts and the pressure imposed on the film from the resilient material 54 position the film for exposure to an image at the image-admitting opening 16. As the film is pulled through the film-guiding means by the film take-up, it may be guided and urged in its travel by the interlocking sprocket 40 as described above and shown in FIG. 2.

A cassette of this invention may be operated from outside of the cassette providing film take-up and advancement in discrete intervals and a controlled exposure of film at the image-admitting window of the cassette by actuation of shutter means adjacent the cassette window.

In a photographic system, a cassette of this invention may be held and operated by a film cassette holder 60. The film cassette holder 60 has a first U-shaped portion 61 to support the cassette 10 in the system. The film cassette holder 60 and cassette 10 are provided with interfitting parts which may be engaged to position and hold the cassette 10 in the holder 60. As shown in FIG. 7, the means on the cassette holder to engage the cassette can comprise a pair of slots or openings 62 to engage a pair of hook-like fasteners 63 projecting forwardly from the forward face of the cassette 10. The projecting hook-like fasteners 63 can be molded as part of one of the cassette enclosure parts, for example part 11. The cassette enclosure part with its projecting hook-like fasteners 63 may be provided with sufficient resiliance that the cassette may be adapted to snap into cassette holder 60 and, by the elastic recovery of the cassette enclosure part 11 and its projecting hook-like fasteners 63, hold and position the cassette 10 in the holder 60.

As shown in FIG. 7, when positioned in the holder 60, the image-admitting opening 16 of the cassette remains unobstructed except as desired by an image-focusing system 70. The cassette holder shown in FIG. 7 has an opening 64 in its second forward wall portion 61a. The cassette holder 60 carries an actuator 65, shown through the opening 64 of FIG. 7. The shutter actuator 65 includes an actuator opening 66 which engages an actuator-engaging surface 21a projecting forwardly from the first element 21 of the shutter means 20. The shutter actuator 65 may be operated by a solenoid or be part of an over-center spring mechanism or any other controllable means to operate the shutter means 20. Also carried by the cassette holder is a second actuator 67 to engage the sprocket 37 of the driving spindle 32 of the film take-up when the cassette 10 is positioned and held in place within the cassette holder 60. The cassette holder 60 may be formed from bent sheet metal, and the cassette actuator 65 and 66 may be movably carried by the cassette holder 60 in any manner convenient to the operation of the actuators by electrically operated solenoids or other such power-actuating means.

Figure 8:
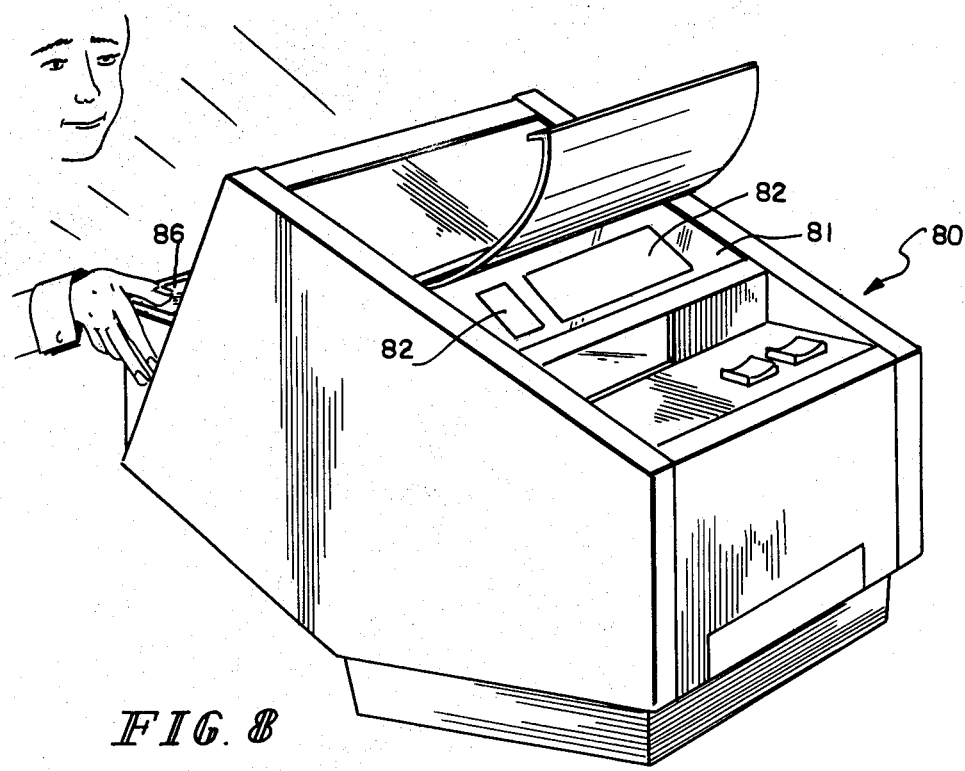
FIG. 8 is a perspective drawing of the check security system.
Figure 9:
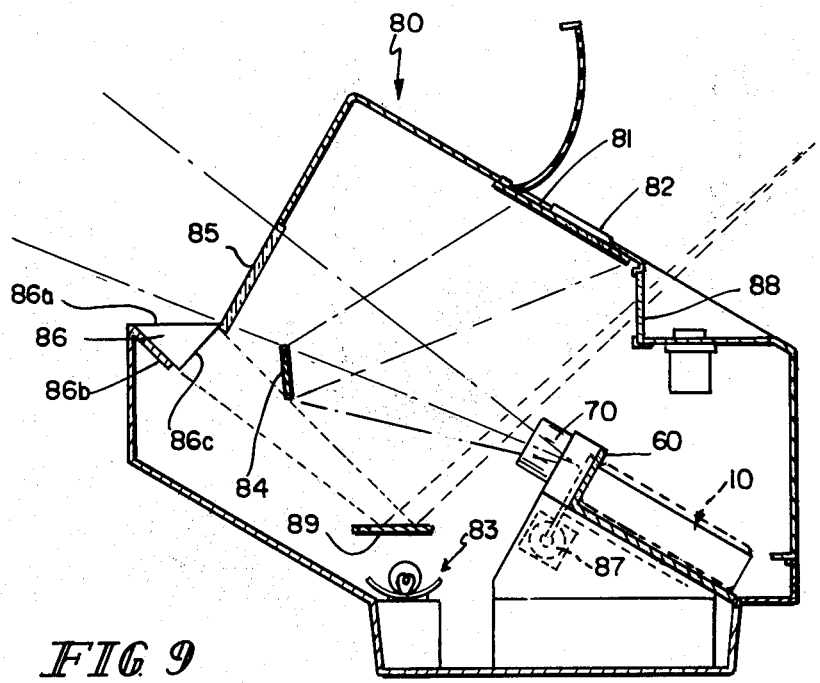
FIG. 9 is a cross-sectional view of the check security system of FIG. 8 incorporating a system of this invention.

FIG. 8 and FIG. 9 show a photographic system of this invention incorporated into a check security system. As indicated in FIG. 8 and FIG. 9, the check security system is designed to provide the simultaneous photographing of a person's face and fingerprints, a check which he wishes to be cashed and documentary identification. As shown in FIG. 9, the photographic system of this invention comprising the cassette 10 and cassette holder 60 are incorporated into the check security system 80 so that the facial image, fingerprint image and check image may be simultaneously directed to different portions of the image-admitting opening of the cassette 10 and focused thereon by an image-focusing optical system 70. The enclosure of the check security system has an upper surface with a window 81 to support the check 82 and other documents and to permit a light 83 within the enclosure to illuminate the face of the documents through the window 81. A mirror 84 reflects the image of the check 82 within the field of view of the image-focusing system 70 which directs the image of the check to a portion of the image-admitting opening 16 of the cassette 10.

A second window 85 in a forward face of the enclosure 80 permits the field of view of the image-focusing system 70 to encompass the face of an individual standing before the check security system 80. As shown, the photographic system of this invention is mounted adjacent the base of the check security system and inclined upwardly to permit it to be directly aimed at an individual standing before the check security system.

A further forward surface of the check security system 80 is formed by one face of a triangular prism 86. The forwardmost prism face, which faces away from the photographic system of the invention, is darkened by a coating preventing light from entering or being reflected from the forwardmost prism face. The rearward face of the prism is unobstructed and within a portion of the field of view of the image-focusing optical system 70. The prism 86 is lighted at one end so that if a finger is pressed against the exposed surface 86a, the bridges of the finger are illuminated and reflect light in a manner that is known to provide a bright image of the fingerprint at the rearward face 86c of the prism. Thus, operation of a shutter means 20 within the system through actuator 65 of the cassette holder 60 by a solenoid 87 within the check security system 80 will permit the exposure of film within the cassette 10 to the three images, permitting the simultaneous photographing of the check 82 and the face and fingerprints of the individual cashing the check.

The check security system 80 is desirably provided with a third window 88 and a second mirror 89 to permit an operator to view the rearward face 86c of the prism to insure that a good photographic image of the fingerprint is present when the system is operated.

As indicated above, the interior of the check security system is lighted and the photographic system of this invention operates in this lighted environment. With the periodic replacement of the preferred cassette 10 of this invention, the shutter means is periodically replaced. The invention also can provide a cassette which permits additional protection against the accidental exposure and loss of an exposed image which is particularly important in check security systems.

While photographic check security systems have been known in the past, none has employed a photographic system of this invention. Such prior photographic systems have included, for example, the systems disclosed in U.S. Pat. Nos. 3,478,658; 3,422,446; 3,158,523; 2,868,069; and 2,817,996. Prior patents relating to the photographic recording of fingerprints have included U.S. Pat. Nos. 3,975,711; 3,906,520; 3,743,421; 3,529,520; 3,282,152; 3,200,701; 3,174,414; 3,138,059; 2,730,936; 2,579,961; and 2,195,699. None of these prior systems provides the security of the photographic system described above.

While I have disclosed a specific embodiment of my invention, modifications may be made without departing from the scope of my invention as set forth in the following claims.

I claim:

1. A film cassette adapted for assembly and operation without fasteners, comprising a cassette enclosure formed from two sections, said cassette enclosure sections having peripheral walls and interfitting edges to form a light-tight barrier at their peripheral walls when assembled and otherwise forming an opening to permit an image to be projected within the cassette, said cassette enclosure sections also having surfaces within the cassette at one end to confine and locate a roll of film within the cassette and having a hole in one of the cassette enclosure sections at the other end and an axle-like post adjacent said hole, said cassette enclosure sections also having two tracks located at the front of the cassette running transversely in front of said image opening, shutter means, including a first element having a film exposing aperture formed therein carried within one of the tracks at the front of the cassette and a second gate element carried within the other of the tracks, said first and second elements interacting to move in said tracks and to controllably expose film within the cassette through the image opening, a film take-up within the cassette including a spool having an open cylindrical center portion and a disk at one end having a toothed periphery, and a driving spindle extending through said hole in one of the cassette enclosure sections and into the open cylindrical center portion of said spool to engage the spool, said driving spindle having at its end outside of the cassette an extended hub forming a sprocket, said extended hub and said spool disk forming a light seal for said hole when said driving spindle is engaged in said spool, an interlocking sprocket within the cassette rotatably carried on said axle post so that the teeth of said interlocking sprocket engage the toothed periphery of the spool disk and an edge of the film within the cassette, said engagement of the spool disk and interlocking sprocket, upon operation of the sprocket of the driving spindle, being capable of advancing film in defined increments and preventing counter rotation of the spool, said cassette thus being capable of assembly without fasteners and of providing for controlled exposure of film one frame at a time.

2. The film cassette of claim 1 adapted for a check security system wherein one of the cassette enclosure sections includes a plurality of projections and the other of the cassette enclosure sections include a plurality of openings to accept the projections of said one enclosure section, said projections and openings being capable of permanent engagement in such a manner that they are incapable of separation once engaged without breaking the cassette enclosure.

3. A film cassette for a check security system comprising a plurality of cassette enclosure sections forming a light tight cassette and a window for exposure of film within the cassette, a film take-up rotatably carried within the cassette by one of the cassette enclosure sections, and a shutter carried by said cassette enclosure sections adjacent said cassette window and actuable to expose film within the cassette to an image focused through said cassette window, said shutter comprising a first element slidably carried by a pair of tracks on said cassette and a second element slidably carried by a second pair of tracks on said cassette, said first element forming an aperture for the admission of light into the cassette window and including a pair of projecting operators for the second element, said first element and second elements extending over said cassette window to bar light from entering the cassette in an unactuated position at one end of their tracks, one of the pair of projecting operators engaging the second element after travel of the first element in one direction in said first pair of tracks and after passage of the aperture over the cassette window to move the second element in the second pair of tracks, said first and second elements thereafter moving together to positions at the other end of the tracks where the second element extends over the cassette window to bar light from entering the cassette window, the other of the pair of projecting operators permitting the first element to be returned to its unactuated position without movement of the second element until the aperture of the first element has passed over the cassette window, said shutter being operable to controllably expose film through the cassette window.

4. The film cassette of claim 3 wherein said first element forms a slot-like aperture, said one of the projecting operators is located at one end of the first element and the other of the projecting operators is located intermediate of the first element with the aperture between said pair of projecting operators, and said second plate has a pair of legs with each of said legs lying in each one of said second pair of tracks.

5. In a molded cassette for photographic film including a film take-up operable from outside the cassette and an image-admitting opening, the improvement comprising a reciprocating shutter mechanism having a pair of molded plastic light-barrier elements slidably carried on the cassette in front of the image-admitting opening, one of said elements including a film-exposing aperture and having operator means engaging the other of said elements to move the other of said elements into a light-barrier position after the film-exposing aperture has been moved past the image-admitting opening in one direction and to leave the other element in the light barrier position until the film-exposing aperture has been moved past the image-admitting opening in the other direction.

6. The improvement of claim 5 wherein said pair of molded plastic light-barrier elements comprise a pair of small plates, each of said plates sliding in one of a pair of parallel and adjacent grooves molded into the outside surface of the cassette and along its front surface transversely of the image-admitting opening, said one of the elements including two surfaces projecting in the direction of the other of said elements, the first of said surfaces being located adjacent the edge of said one element and engaging the other of said elements at its one end, the second of said surfaces being located on said one element with the film-exposing aperture between the two surfaces and engaging the other of said elements at its other end.

7. In a molded plastic cassette for photographic film including a film take-up operable from outside of the cassette and an image-admitting opening, the improvement wherein said film take-up comprises an inner spool having an open cylindrical center portion and a disk at one end thereof, and a spool driving spindle extending through a bearing opening in one side of the cassette and into the open cylindrical center portion of the spool to engage the spool and be capable of engaging film, said spool driving spindle including a hub forming a sprocket to drive the film take-up, said disk and hub forming a barrier to the entry of light into the cassette through the bearing opening.

8. The improvement of claim 7 wherein the outer periphery of the disk of said spool includes a plurality of projecting teeth, the interior of the cassette includes an axle-like projection adjacent to the periphery of the spool and parallel to its open cylindrical center portion, and an interlocking sprocket is rotatably carried on the axle-like projection with a plurality of projecting teeth spaced about its periphery to engage the plurality of projecting teeth at the periphery of said spool and a series of holes in the edge of the film to thereby provide for film advancement and to prevent rotation of the spool in a direction counter to its direction of rotation by said driving sprocket.

9. In a molded plastic cassette for photographic film including a film take-up operable from outside of the cassette and an image-admitting opening, the improvement comprising a plurality of surfaces projecting from the inner surfaces of the cassette to position a roll of film at one end of a cassette, to prevent its unwinding and to reduce the frictional engagement of the film and the cassette, and a film guide within the cassette immediately adjacent the image-admitting opening, and wherein the film take-up includes a spool within the cassette includng a split and open inner cylinder and a driving spindle extending into the cassette and into the split and open cylinder of the spool to provide engagement of the film and operation of the film take-up.

10. The improvement of claim 9 wherein said film guide forms an arcuate guide wall leading to a chamber immediately behind the image-admitting opening, said chamber being capable of encompassing a resilient backing material to urge the film strip against film positioning cassette surfaces adjacent the image-admitting opening, and a sprocket is rotatably carried on an axle-like projection between the chamber and the film take-up, said sprocket having a plurality of projecting teeth to engage the periphery of the spool and prevent its rotation in a direction counter to the direction of operation of the film take up and to further engage and guide the film from the image admitting opening onto the film take-up.

11. A film cassette from molded plastic parts adapted for assembly and operation without fasteners comprising
two part means forming an enclosure with an image-admitting window and a bearing opening for operation of a film take-up,
a shutter mechanism slidably carried by surfaces of said two part means upon their assembly to close the image-admitting window and to controllably expose film within the cassette through said image-admitting window,
a film take-up within the cassette including an internal spool and a driving spindle extending into the cassette through the bearing opening and into the internal spool, said driving spindle being operable from outside of the cassette to drive the film take-up,
said two part means, upon insertion of the driving spindle into the spool, upon assembly of the shutter means to the surfaces of the two part means and upon assembly of the two part means, forming an film enclosure with light barriers at the image-admitting window and the bearing opening while permitting the controlled exposure of film carried within the enclosure to a plurality of sequential and separate images.

12. A photographic system, comprising a film cassette, a film cassette holder and a separate optical system, said film cassette forming a light-tight enclosure with an image-admitting opening and a second opening for operation of a film take-up, a film take-up within the cassette, including an internal spool and a driving spindle extending into the cassette through the second opening and into the internal spool, said driving spindle being operable from outside of the cassette to drive the cassette film take-up, said film cassette holder consisting essentially of an open bracket having a portion to support and engage the film cassette without obstructing the image-admitting opening of the cassette, a first actuator carried by the cassette holder to operate a shutter means adjacent the image-admitting opening of the cassette to permit the controlled exposure of film within the cassette and a second actuator carried by the cassette holder to engage and operate the driving spindle of the film cassette whereby said system can be operated in the open and permit the controlled exposure of film carried within the cassette to a plurality of sequential and separate images.

13. The photographic system of claim 12 wherein said shutter means is carried at the forward portion of said film cassette and includes an element forming a film-exposing aperture that is guided by the cassette across the image-admitting opening of the cassette, said element having an extension projecting forwardly and engageable by said actuator carried by the cassette holder, said cassette engaging the cassette holder so that the extension extends into engagement with said actuator.

14. The photographic system of claim 12 wherein the film cassette includes a pair of extending hook-like holders, the film cassette holder has a forward wall portion to engage the film cassette and the forward wall portion has openings engageable with the pair of extending hook-like holders of the film cassette, said pair of extending hook-like holders having sufficient elasticity to deform and engage said openings and upon their elastic recovery to position and hold the film cassette in the cassette holder.

15. The photographic system of claim 12, claim 13 or claim 14 wherein said photographic system is incorporated in an enclosure adapted to impose three separate images at the image-admitting opening of the film cassette and to expose film within the cassette simultaneously with a facial image, a fingerprint image and the image of a negotiable instrument.

16. The invention of claim 12 wherein said bracket has a first portion to support the film cassette and a second cassette engaging portion, said second cassette engaging portion being open adjacent the image-admitting opening of the cassette and carrying said first actuator, said first portion carrying said second actuator to engage and actuate a cassette film take-up, thereby providing a means to position and hold the film cassette with respect to an image-focusing optical system and to operate a shutter and advance a film strip for sequential exposure of a plurality of frames.

17. The invention of claim 16 wherein the film cassette holder is formed from a single metal sheet, said first portion is generally U-shaped and provided with mounting holes and said second portion is a forward wall with an opening in its central portion, a first shutter actuator is carried on the front wall and a second film take-up actuator is carried at the bottom of the U-shaped portion.

18. A method of manufacturing a film cassette of thermoplastic material without fasteners comprising molding a plurality of cassette parts from a thermoplastic material including two enclosure parts, a first film take-up part to take-up film within the cassette and a second film take-up part to drive the first part frm outside of the cassette and shutter elements, providing a film take-up mechanism for the cassette by pressing together the first film take-up part from within an enclosure part and the second film take-up part from outside the enclosure part with the enclosure part therebetween and with the end of a roll of film to be exposed between the first and second film take-up parts, providing a shutter means by assembling the shutter elements to element receiving portions of the enclosure parts, assembling the enclosure parts by placing them together with the roll of film within the enclosure and the shutter elements and film take-up parts movably carried by the enclosure parts, and sealing the two enclosure parts together by melting interfitting portions of said enclosure parts.

19. A sealed film cassette from molded plastic parts comprising two part means forming an enclosure with an image-admitting opening and a second opening for operation of a film take-up, said two part means having interfitting and sealable portions, permitting the two parts to be sealed into an integral enclosure without any means of access to the film within the enclosure, a shutter mechanism carried by said two part means upon their assembly to close and controllably admit an image into the cassette through said image admitting opening, a film take-up within the cassette being operable through said second opening to drive the film take-up, said two part means, upon assembly of the film take-up and the shutter means to the two part means and assembly of the two part means, being sealed into an integral enclosure at the interfitting portions.

20. A molded plastic cassette for photographic film within its interior, comprising an enclosure having an image-admitting opening and a film take-up operable from outside of the cassette and including an inner spool having an open cylindrical center portion and a spool-driving spindle extending through a bearing opening in one side of the enclosure and into the open cylindrical center portion of the spool to engage the spool and be capable of engaging film, the inner spool having a disk at one end thereof with its outer periphery having a plurality of projecting teeth, the interior of the enclosure including an axle-like projection adjacent to the periphery of the inner spool and parallel to its open cylindrical center portion, an interlocking sprocket being rotatably carried on the axle-like projection with a plurality of projecting sprocket teeth spaced about its periphery to engage both the toothed periphery of said spool and a series of holes in an edge of the film to provide film advancement and to prevent rotation of the spool in a direction counter to its direction of rotation by said driving sprocket.

21. The molded plastic cassette of claim 20 wherein the spool-driving spindle includes a hub forming a sprocket to drive the film and to coact with the disk and the inner spool to form a barrier to the entry of light through the bearing opening.

22. A molded plastic cassette, comprising an inner surface for enclosing a photographic film having an image-admitting opening and a film take-up operable from outside of the cassette, a plurality of surfaces projecting from the inner surface of the cassette to position a roll of film at one end of a cassette to prevent its unwinding and to reduce the frictional engagement of the film and the cassette, a film guide formed within the cassette immediately adjacent the image-admitting opening, said film guide including an arcuate guide wall leading to a chamber immediately behind the image-admitting opening, said chamber being capable of encompassing a resilient backing material to urge the film strip against film positioning cassette surfaces adjacent the image-admitting opening, said film take-up including a spool with an open inner cylinder within the cassette and a driving spindle extending into the cassette and into the open cylinder of the spool to provide engagement of the film and operation of the film take-up, and a sprocket rotatably carried on an axle-like projection from the inner surface between the chamber and the film take-up, said sprocket having a plurality of projecting teeth to engage the periphery of the spool and prevent its rotation in a direction counter to the direction of operation of the film take-up and to further engage and guide the film from the image-admitting opening onto the film take-up.

23. A photographic system, comprising a film cassette, a film cassette holder and a separate optical system, said film cassette forming a light-tight enclosure with an image-admitting opening at its forward portion with shutter means carried adjacent the image-admitting opening and including an element forming a film-exposing aperture that is guided by the cassette across the image-admitting opening of the cassette, said element having an extension projecting forwardly of the cassette, said cassette also having a second opening for operation of a film take-up within the cassette including an inner spool, and a driving spindle extending into the cassette through the second opening and into the inner spool, said driving spindle being operable from outside of the cassette to drive the cassette film take-up, said film cassette holder including a bracket having a portion to support and engage the film cassette without obstructing the image-admitting opening of the cassette, a first actuator carried by the cassette holder to engage the extension of the shutter means element to permit the controlled exposure of film within the cassette and a second actuator carried by the cassette holder to engage and operate the driving spindle of the film cassette, said cassette engaging the cassette holder so that said extension engages said first actuator and said driving spindle engages said second actuator whereby said system can be operated in the open and permit the controlled exposure of film carried within the cassette to a plurality of sequential and separate images.

24. A photographic system, comprising a film cassette, a cassette holder and a separate optical system, said film cassette forming a light-tight enclosure with an image-admitting opening and a second opening for operation of a film take-up, a film take-up including a spool within the cassette and a driving spindle extending into the cassette through the second opening and into the inner spool, said driving spindle being operable from outside of the cassette to drive the cassette film take-up, said film cassette further including a pair of extending hook-like holders, said cassette holder having a forward wall portion with openings capable of engagement with the pair of extending hook-like holders of the film cassette to support the film cassette without obstructing the image-admitting opening of the cassette, a first actuator carried by the cassette holder to operate a shutter means adjacent the image-admitting opening of the cassette to permit the controlled exposure of film within the cassette and a second actuator carried by the cassette holder to engage and operate the driving spindle of the film cassette whereby said system can be operated in the open and permit the controlled exposure of film carried within the cassette to a plurality of sequential and separate images, said pair of extending hook-like holders having sufficient elasticity to deform and engage said openings and upon their elastic recovery to position and hold the film cassette in the cassette holder.

* * * * *

UNITED STATES PATENT AND TRADEMARK OFFICE
CERTIFICATE OF CORRECTION

PATENT NO. : 4,264,166
DATED : April 28, 1981
INVENTOR(S) : Robert E. Morris

It is certified that error appears in the above-identified patent and that said Letters Patent are hereby corrected as shown below:

Col. 6, line 32, delete "maybe" and insert therefor --may be--.

Col. 7, lines 19-20, delete "resiliance" and insert therefor --resilience--.

Col. 9, line 44, delete "include" and insert therefor --includes--.

Col. 11, line 24, delete "includng" and insert therefor --including--.

Col. 13, line 7, delete "frm" and insert therefor --from--.

Signed and Sealed this

Twenty-fifth Day of August 1981

[SEAL]

Attest:

GERALD J. MOSSINGHOFF

Attesting Officer

Commissioner of Patents and Trademarks